US007017537B2

(12) United States Patent
Osburg et al.

(10) Patent No.: US 7,017,537 B2
(45) Date of Patent: Mar. 28, 2006

(54) TWO-STROKE ENGINE AND METHOD FOR OPERATING THE SAME

(75) Inventors: Gerhard Osburg, Kernen (DE); Wolfgang Luithardt, Waiblingen (DE); Simon Jug, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/759,003

(22) Filed: Jan. 20, 2004

(65) Prior Publication Data

US 2004/0144343 A1 Jul. 29, 2004

(30) Foreign Application Priority Data

Jan. 18, 2003 (DE) ................................ 103 01 732

(51) Int. Cl.
*F02M 25/08* (2006.01)

(52) U.S. Cl. ................................ 123/73 A; 123/73 PP

(58) Field of Classification Search .............. 123/73 R, 123/73 A, 73 AA, 73 C, 73 FA, 74 AP, 65 A, 123/73 PP, 65 P
See application file for complete search history.

(56) References Cited

U.S. PATENT DOCUMENTS 1,722,951 A * 7/1929 Barkeij ..................... 123/73 A
2,317,772 A * 4/1943 Huber et al. .............. 123/73 A
3,881,454 A * 5/1975 Jaulmes .................... 123/73 B
4,075,985 A * 2/1978 Iwai ......................... 123/73 A
4,290,394 A 9/1981 Frank et al.
5,027,759 A 7/1991 Luo
5,092,288 A 3/1992 Staerzl
5,201,288 A 4/1993 Doragrip
6,135,072 A * 10/2000 Kishita ..................... 123/73 A
6,354,251 B1 * 3/2002 Toda ........................ 123/73 A
6,418,891 B1 * 7/2002 Kobayashi .............. 123/73 PP
6,497,204 B1 12/2002 Miyazaki et al.

* cited by examiner

*Primary Examiner*—Marguerite McMahon
(74) *Attorney, Agent, or Firm*—Walter Ottesen

(57) ABSTRACT

A two-stroke engine (1) is especially for a handheld work apparatus such as a motor-driven chain saw, a cutoff machine or the like and has a cylinder (2) wherein a combustion chamber (3) is formed. The combustion chamber (3) is delimited by a reciprocating piston (5). The piston (5) drives a crankshaft (7) via a connecting rod (6). The crankshaft (7) is rotatably journalled in the crankcase (4). The combustion chamber (3) is connected to the crankcase (4) at pregiven piston positions via at least one transfer channel (11). The combustion chamber (3) has an outlet (10) for exhaust gases. An air channel (9) is provided which conducts combustion air into the crankcase (4) and a throttle element is mounted in the air channel (9). A compact configuration of the two-stroke engine (1) can be achieved when a separate fuel inlet (13) is provided in the crankcase (4) which is fed by a fuel metering system (15). The fuel metering system (15) has means for supplying fuel in dependence upon the position of the throttle element and/or in dependence upon the engine rpm. A method for operating the two-stroke engine (1) provides that the fuel is prepared to an air/fuel mixture in the crankcase (4) with the combustion air supplied via the air inlet (14).

16 Claims, 4 Drawing Sheets

1
35
2
3
12
11
14
10
31
34
9
29
30
5
8
13
6
4
7

42
16
22
15
17
9
40
24
25
18
8
33
23
21
13
32
36
20
19
37
14

16
23
15
17
22
9
40
24
25
8
33
21
32
38
20
19

TWO-STROKE ENGINE AND METHOD FOR OPERATING THE SAME

CROSS REFERENCE TO RELATED APPLICATION

This application claims priority of German patent application no. 103 01 732.1, filed Jan. 18, 2003, the entire content of which is incorporated herein by reference.

BACKGROUND OF THE INVENTION

U.S. Pat. No. 6,497,204 discloses a two-stroke engine which has an inlet for an air/fuel mixture which is prepared in a carburetor. Additionally, an inlet is provided for substantially fuel-free air for scavenging advance storage. The carburetor requires a comparatively large space for accommodating the same because a large flow cross section must be provided in order to be able to feed a sufficient quantity of the air/fuel mixture. At the same time, the venturi tube, which is configured in the carburetor, needs much space to accommodate the same. The carburetor furthermore must be mounted in a region which is non-critical as to temperature.

SUMMARY OF THE INVENTION

It is an object of the invention to provide a two-stroke engine which requires a reduced structural space for accommodating the same. It is a further object of the invention to provide a method for operating a two-stroke engine accommodated in a small structural space.

The two-stroke internal combustion engine of the invention, including an engine for a portable handheld work apparatus, includes: a cylinder having a cylinder wall; a piston mounted in the cylinder to undergo a reciprocating movement along a stroke path during operation of the engine; the cylinder and the piston conjointly delimiting a combustion chamber; a crankcase connected to the cylinder; a crankshaft rotatably mounted in the crankcase; a connecting rod connecting the piston to the crankshaft to permit the piston to drive the crankshaft as the piston reciprocates in the cylinder; an outlet for conducting exhaust gases away from the combustion chamber; at least one transfer channel for connecting the combustion chamber to the crankcase at predetermined positions of the piston; an air channel for supplying combustion air into the crankcase; a throttle element mounted in the air channel; a separate fuel inlet in the crankcase; a fuel metering system for metering fuel into the separate fuel inlet; and, the fuel metering system including metering means for metering fuel in dependence upon at least one of the position of the throttle element and the rpm of the engine.

Combustion air and fuel are supplied separately to the two-stroke engine. In this way, the air channel can be mounted where temperature is critical. The fuel is not prepared in a carburetor but is metered in droplet form or as an emulsion via a fuel metering system. The preparation of the fuel with the combustion air to form an air/fuel mixture takes place only in the crankcase. The fuel metering system meters the fuel in dependence upon the position of a throttle element and/or in dependence upon the engine rpm and not, as is customary in carburetors, via the air mass flow. With the separate supply of fuel and combustion air, the control times for the supply of fuel and combustion air can be adjusted separately. In this way, the full-load characteristic of the two-stroke engine can be positively influenced. Furthermore, back spattering effects as they occur in conventional carburetors are avoided by the fuel metering system.

The fuel metering system includes a fuel-opening element defining a fuel opening which is connected to a control unit. The fuel is supplied to the crankcase in droplet form or as an emulsion. For this reason, a fine atomization of the fuel at the fuel opening is not necessary. The fuel opening can therefore be simply configured and the pressure, which is present in the control unit, can be low compared to the pressure present at injection nozzles. The means for metering fuel includes a regulator needle which controls the free cross section of the fuel opening. In this way, a simple configuration of the fuel metering system results. The position of the regulator needle is coupled to the position of the throttle element. A simple coupling can be achieved when the throttle element is a throttle flap which is pivotably mounted in the air channel utilizing a throttle shaft and when the throttle shaft has a segment which has a control cross section, which deviates from the circular form, and operates or acts on the regulator needle. It can be advantageous when the fuel metering system includes an electromagnetic valve.

The fuel opening opens into a fuel channel which is connected to the fuel inlet. Advantageously, the fuel channel has an inlet for air as a carrier medium for the fuel with the inlet being upstream of the fuel metering system. The air, which flows through the fuel channel, ensures that the fuel reaches the crankcase from the fuel opening through the fuel inlet. The air quantity, which flows through the fuel channel, is significantly less than the air quantity flowing through the air channel. The fuel channel has only a small flow cross section so that only small quantities of fuel deposit on the channel wall. In this way, a mixture enrichment is avoided when there is a sudden reduction of rpm.

The fuel inlet is connected via a membrane valve to the crankcase in order to be able to control the fuel inlet independently from the air inlet. It can, however, be practical that the fuel inlet is connected via a check valve to the crankcase. A slot control of the fuel inlet can also be advantageous. In this way, additional valves are unnecessary.

The air channel opens at an air inlet which is arranged on the cylinder in the region of the piston and which air inlet is connected to the crankcase via at least one piston window and the transfer channel at pregiven piston positions. The air, which flows through the air channel, scavenges thereby the transfer channels and ensures a scavenging advance storage which is substantially free of fuel. The inlet and the transfer channels can be arranged over a large region of the periphery of the cylinder because an inlet for the air/fuel mixture is not provided. The piston window extends over at least 10% of the periphery of the piston. Advantageously, the piston extends over more than 30% and especially more than 40% of the periphery of the piston.

It can be practical that the air channel opens directly into the crankcase at pregiven piston positions. In this way, the two-stroke engine can be supplied with a large quantity of combustion air.

A method for operating a two-stroke engine (which has an air inlet for substantially fuel-free combustion air) provides that the crankcase is supplied with fuel via a separate fuel inlet and the fuel is processed with the combustion air, which is supplied through the air inlet, in the crankcase to form an air/fuel mixture. The preparation of the air/fuel mixture in the crankcase makes it possible to operate the two-stroke engine without a separate carburetor or a complexly configured injection nozzle. The fuel is supplied in droplet form or as an emulsion to the crankcase and deposits on the hot crankcase walls inside the crankcase. From there, the fuel vaporizes and is mixed with the combustion air present in the crankcase. The fuel ensures a good lubrication of the crankcase.

The fuel is supplied to the crankcase with air as a carrier medium. 0% to 20% of the total combustion air is supplied to the engine through the fuel inlet. The small component of combustion air, which is supplied through the fuel inlet, makes possible the configuration of the fuel inlet with a small flow cross section so that only a small structural space is needed for mounting the fuel inlet where the temperature is non-critical. The air inlet needs a comparatively large structural space and can, in contrast, be mounted where temperature is critical so that the two-stroke engine overall needs only a small structural space and can be well adapted to the existing structural conditions.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
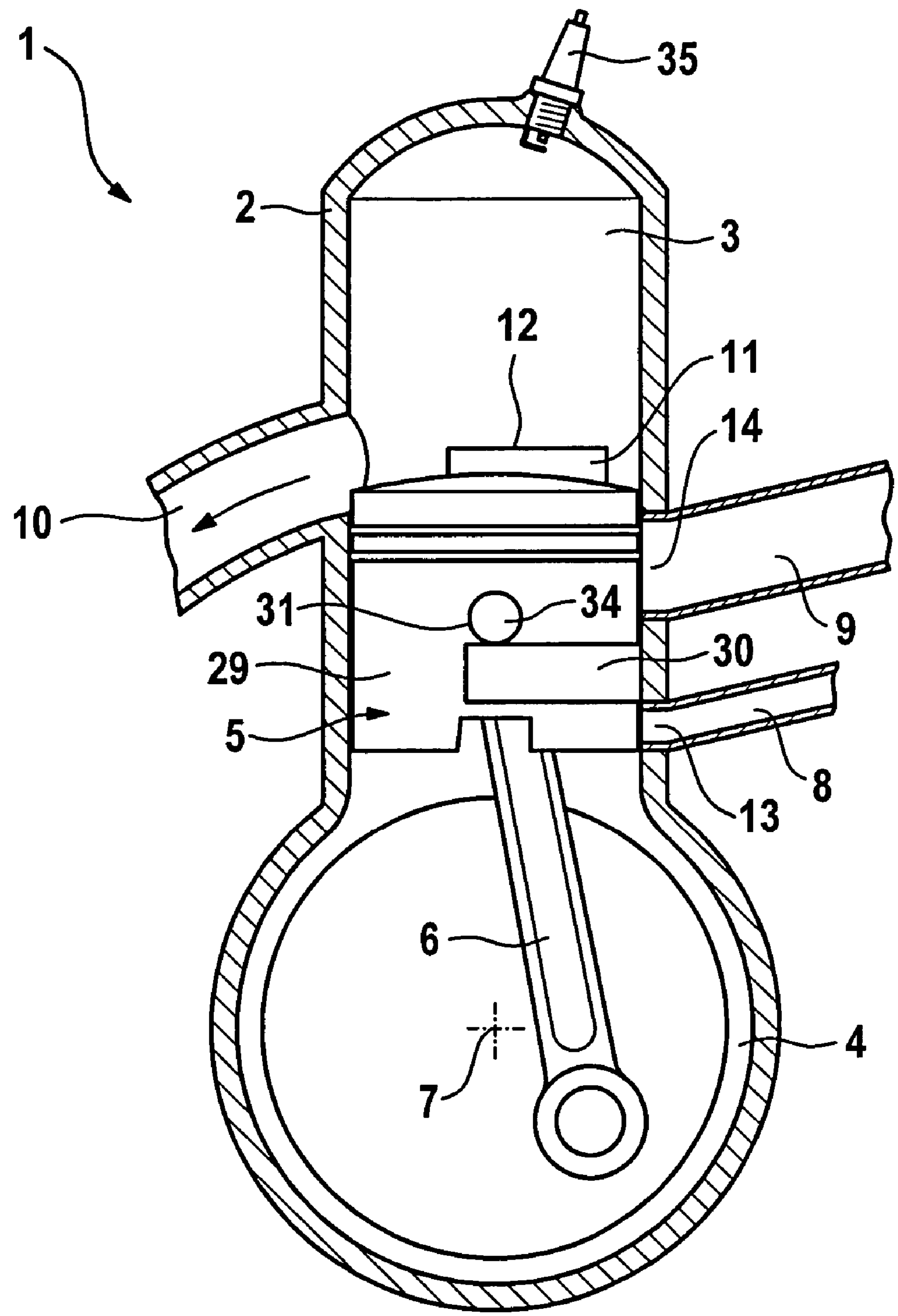
FIG. 1 is a section view of a two-stroke engine.

The two-stroke engine 1 shown in FIG. 1 includes a cylinder 2 wherein a combustion chamber 3 is configured. An outlet 10 leads out from the combustion chamber 3. The combustion chamber 3 is delimited by a reciprocating piston 5 in the direction toward a crankcase 4. The piston 5 drives a crankshaft 7 via a connecting rod 6. The crankshaft 7 is rotatably journalled in the crankcase 4 and the connecting rod 6 is connected via a piston pin 34 to the piston 5. The piston pin 34 extends through two symmetrically arranged piston bosses 31 in the piston 5. A fuel channel 8 opens at the cylinder 2 and is closed by the piston 5 in the region of bottom dead center of the piston 5. In the region of top dead center of the piston 5, the fuel channel 8 opens via the fuel inlet 13 into the crankcase 4.

An air channel 9 opens via an air inlet at the cylinder 2. The air inlet 14 is arranged in the region of the cylinder 2. The air inlet 14 can be closed by the piston 5 in each position thereof but, especially for metering large quantities of combustion air, it is provided that the air inlet opens directly into the crankcase 4 at pregiven positions of the piston 5. Crankcase 4 and combustion chamber 3 are fluidly connected to each other via transfer channels 11 in pregiven positions of the piston 5, especially in the region of bottom dead center of the piston 5. It is practical to provide two symmetrically arranged transfer channels 11; however, another number of transfer channels 11 can also be practical. The transfer channels 11 each open into the combustion chamber 3 via a transfer window 12. The piston 5 has a piston window 30 which extends radially inwardly from the piston skirt 29. In pregiven positions of the piston 5, and especially in the region of top dead center, the air channel 9 is connected to the crankcase 4 via the air inlet 14, the piston window 30 and the transfer channels 11.

During operation of the two-stroke engine 1, fuel is supplied through the fuel inlet 13 to the crankcase 4. In the region of top dead center of the piston 5, combustion air is supplied to the crankcase 4 via the air channel 9, piston window 30 and the transfer channels 11. In the region of top dead center of the piston 5, the air channel 9 can open directly into the crankcase 4 and, in this way, additional combustion air is supplied. The fuel, which is supplied to the crankcase 4, deposits on the hot walls in the crankcase 4 and vaporizes from there. The fuel is broken up into fine droplets by the moving parts in the crankcase 4. The fuel is so prepared in the crankcase 4 with the combustion air, which is supplied by the air channel 9, to an air/fuel mixture. With an upward stroke of the piston 5, the transfer windows 12 of the transfer channels 11 open in the region of bottom dead center to the combustion chamber 3. At first, advance stored, substantially fuel-free combustion air flows through the transfer channels 11 into the combustion chamber 3. The substantially fuel-free combustion air prevents that the after-flowing air/fuel mixture from the crankcase 4 can escape from the combustion chamber 3 with the exhaust gases through the outlet 10 from the combustion chamber 3. For an upward movement of the piston 5, the air/fuel mixture in the combustion chamber 3 is compressed and is ignited by the spark plug 35 in the region of top dead center of the piston 5. As soon as the piston 5 clears the outlet 10 with a downward movement in the direction toward the crankcase 4, the exhaust gases flow through the outlet 10 out of the combustion chamber 3 and combustion air and air/fuel mixture flow after through the transfer channels 11 into the combustion chamber 3.

Figure 2:
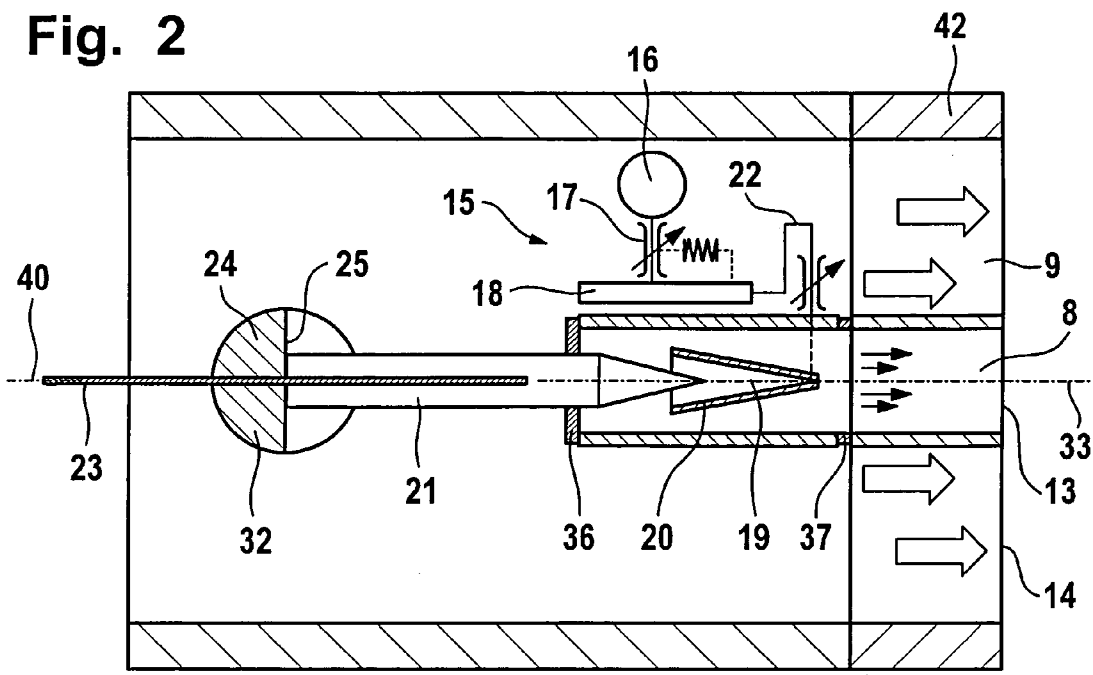
FIG. 2 is a schematic representation of air channel and fuel channel having a fuel metering system in the full-load position.

The fuel channel 8 is fed by a fuel metering system 15 which is shown schematically in FIG. 2. The fuel metering system 15 has a pump 16 which feeds fuel to a control chamber 18 via a valve 17. The control chamber 18 is connected via a fuel line 22 to a fuel opening 19 which is configured on a regulator wedge 20. In lieu of the control chamber 18, another control unit can be advantageous to use. A regulator needle 21 projects into the regulator wedge 20, which is shown schematically in FIG. 2, and changes the free cross section at the fuel opening 19 when the needle is shifted in the direction of the longitudinal center axis 33 of the fuel channel 8. With the displacement of the regulator needle 21 in the direction of the longitudinal center axis 33, the fuel quantity can be varied which is supplied to the two-stroke engine 1. The fuel opening 19 makes fuel available continuously to the fuel channel 8.

In air channel 9, a throttle flap 23 is mounted which is pivotably journalled in the air channel 9 with a throttle shaft 24. In lieu of the throttle flap 23, also another throttle element can be used. In FIG. 2, the throttle flap 23 is shown in the full-load position. In this position, the throttle flap 23 extends in the longitudinal direction of the fuel channel 8 and restricts the flow cross section in the air channel 9 only insignificantly. The throttle shaft 24 has a control cross section 32 which has a flat 25. The control cross section 32 is configured as a semi-circle; however, other cross sections can be practical.

In the full-load position shown in FIG. 2, the flat 25 extends perpendicular to the longitudinal center axis 40 of the air channel 9. The regulator needle 21 of the fuel metering system 15 lies on the flat 25. With a rotation of the throttle shaft 24, the regulator needle 21 is moved by the control cross section 32 in the direction of the longitudinal center axis 33 of the fuel channel 8. The position of the regulator needle 21 is thereby coupled to the position of the throttle flap 23. In order to avoid that fuel from the fuel metering system 15 reaches the air channel 9, seals 36 and 37 are mounted on the fuel metering system 15 which seal off the fuel channel 8 relative to the ambient. The air channel 9 and the fuel channel 8 each open at the two-stroke engine 1 via a schematically shown flange 42. It is practical that air channel 9 and fuel channel 8 have separate flanges 42 at which the fuel inlet 13 and the air inlet 14 are configured, respectively.

Figure 3:
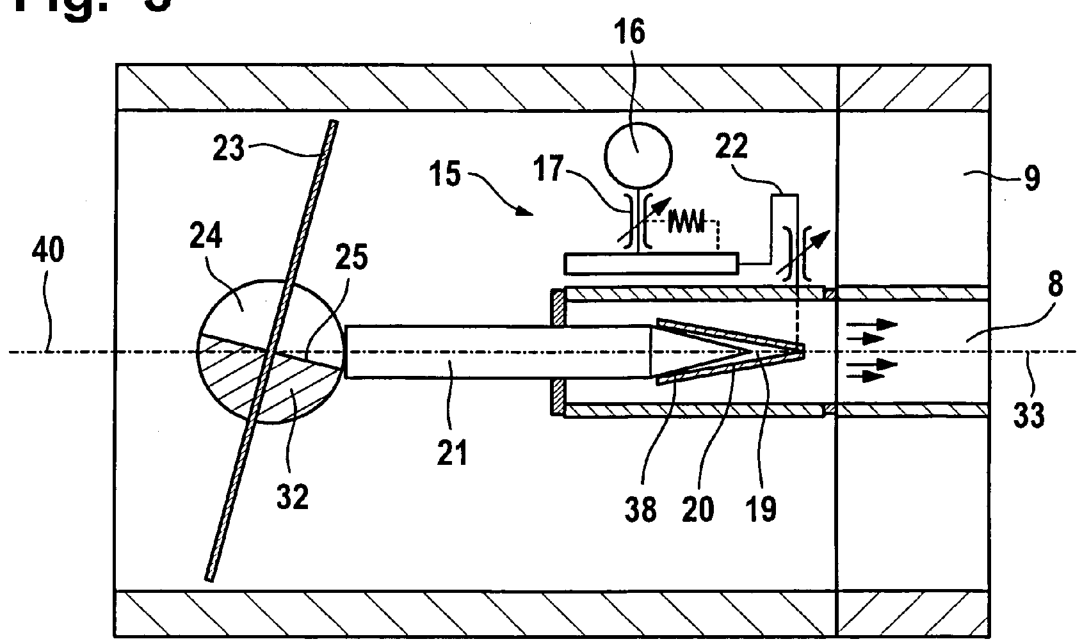
FIG. 3 shows the system of FIG. 2 in the idle position.

In FIG. 3, the throttle flap 23 is shown in the closed position, that is, in the idle position. In this position, the throttle flap 23 essentially closes the flow cross section in the air channel 9. The regulator needle 21 is displaced by the control cross section 32 in the direction of the longitudinal center axis 40 of the air channel 9 so that the tip 38 of the regulator needle 21 substantially closes the regulator wedge 20 and therefore the fuel opening 19 opening into the regulator wedge 20. In this way, only a slight quantity of fuel can reach the fuel channel 8 through the fuel opening 19. No or only a very slight quantity of combustion air reaches the two-stroke engine 1 because of the position of the throttle flap 23.

The position of the regulator needle 21 can also be coupled to the engine rpm. Especially, the position of the regulator needle 21 is coupled to the position of a throttle element (especially the throttle flap 23) and to the engine rpm. It can be advantageous that the fuel metering system includes an electromagnetic valve so that the coupling takes place electrically instead of mechanically. In the embodiment shown in FIGS. 2 and 3, the fuel channel 8 opens into the region of the piston 5 as shown in FIG. 1 and is slot controlled by the piston 5.

Figure 4:
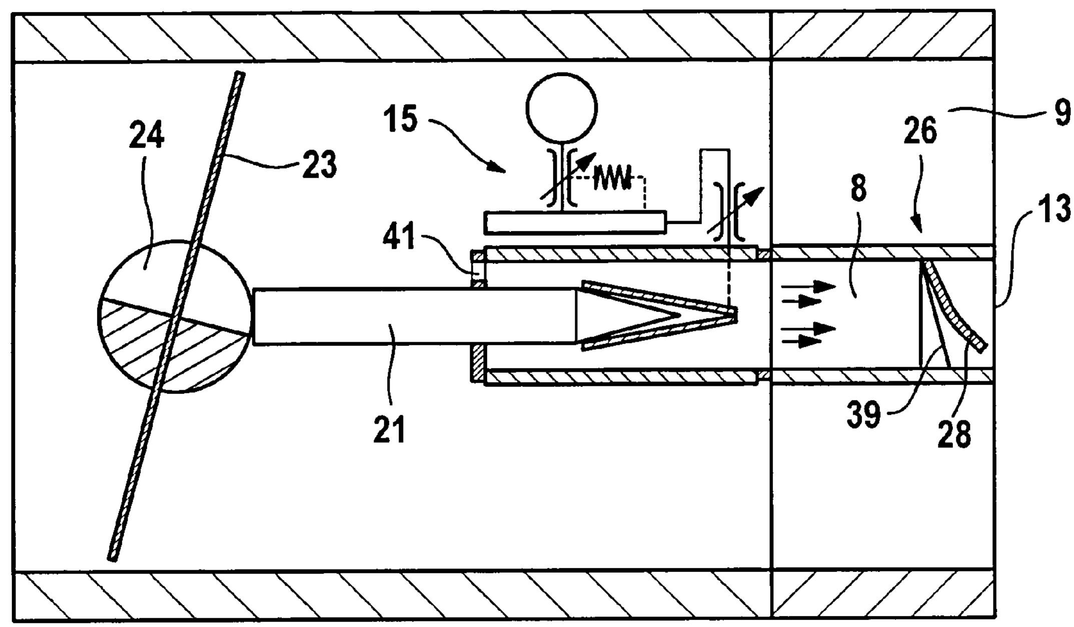
FIG. 4 shows the system of FIG. 3 with a membrane valve in the fuel channel.

The embodiment shown in FIG. 4 is for a fuel metering system 15 wherein the fuel channel 8 opens via a membrane valve 26 at the crankcase 4. The connection of fuel channel 8 and crankcase 4 is therefore controlled in dependence upon pressure. The membrane valve 26 has a membrane 28 which is shown in the open position in FIG. 4. In the closed position of the membrane valve 26, the membrane 28 lies against a sealing seat 39.

In the embodiment of FIG. 4, the fuel channel 8 has an inlet 41 for air as a carrier medium for the fuel with the inlet 41 being connected to the air channel 9. The inlet 41 can, however, also open at the clean side of the air filter. The inlet is mounted upstream of the fuel metering system 15 in the fuel channel 8. The fuel channel 8 has only a small flow cross section so that only 0% to 20% of the total combustion air, which is supplied to the engine 1, flows through the fuel channel 8. 80% to 100% of the combustion air flows through the air channel 9. The fuel channel 8 has only a small flow cross section. At the walls of the fuel channel 8, only small quantities of fuel can thereby deposit. For a sudden reduction of rpm, an excessive enrichment of the air/fuel mixture, which is formed in the crankcase 4, is avoided hereby. The combustion air, which flows through the fuel channel 8, functions as a carrier medium for the fuel.

Figure 5:
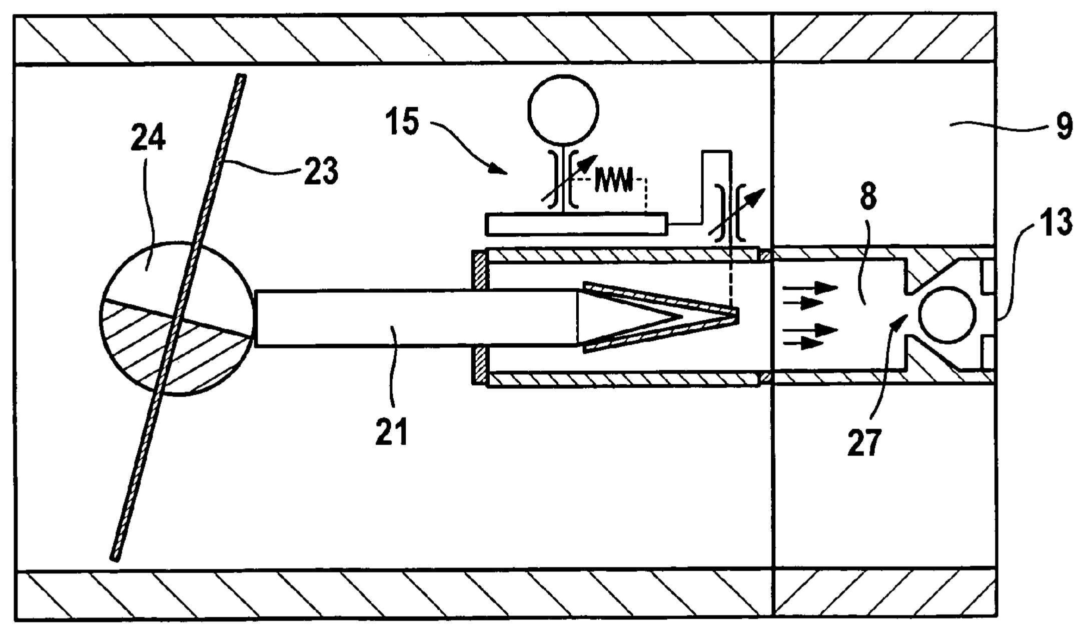
FIG. 5 shows the system of FIG. 3 equipped with a check valve in the fuel channel.

As shown in FIG. 5, a check valve 27 can be provided in the fuel channel 8 in lieu of a membrane valve 26. The membrane valve 26 or the check valve 27 is mounted in the region of the fuel inlet 13 into the crankcase 4.

Figure 6:
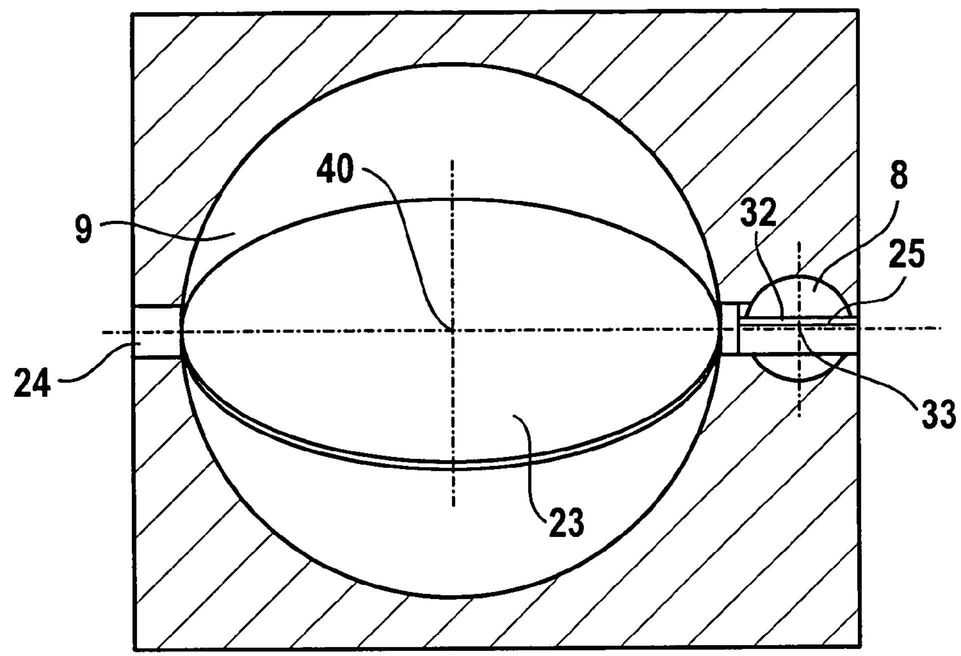
FIG. 6 is a schematic representation of the arrangement of fuel channel and air channel; and, FIG. 7 is a developed view of the cylinder and piston.

In FIG. 6, the arrangement of the air channel 9 and the fuel channel 8 are shown schematically. The fuel channel 8 is mounted laterally of the air channel 9 and is displaced in the direction of the throttle shaft 24 relative to the air channel 9. The throttle shaft 24 intersects thereby the longitudinal center axis 40 of the air channel 9 and the longitudinal center axis 33 of the fuel channel 8. The throttle shaft 24 has a control cross section 32 in the region of the fuel channel 8.

Figure 7:
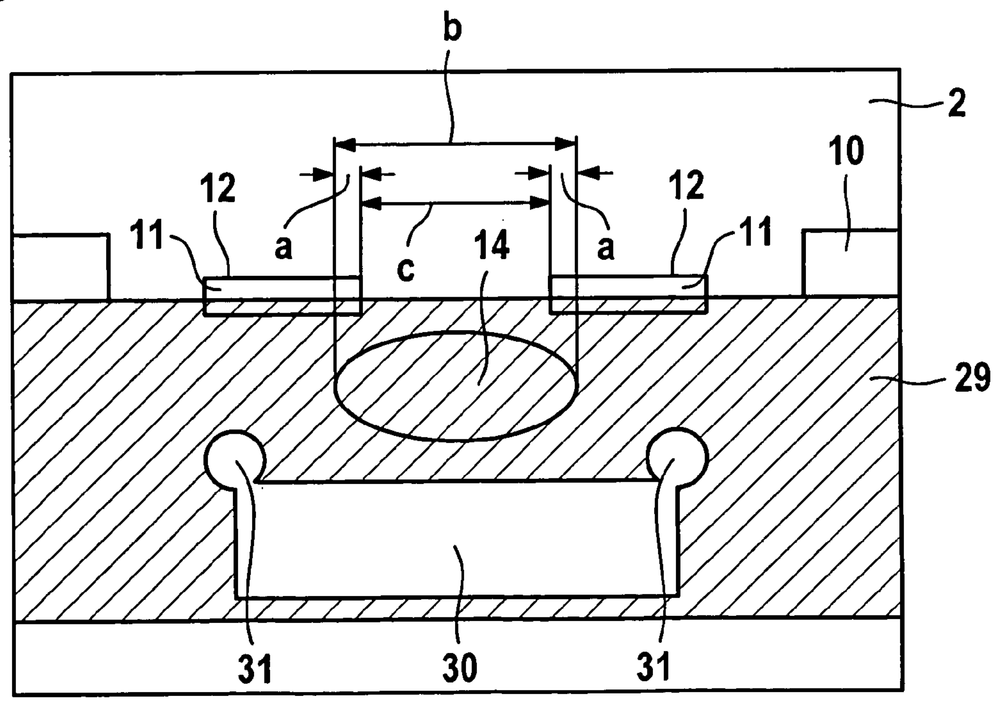

In FIG. 7, a developed view of the cylinder 2 and of the piston skirt 29 are shown. At its periphery, the cylinder 2 has an outlet 10, two transfer windows 12 and an air inlet 14 arranged in the direction toward the crankcase 4 opposite the transfer windows 12. The air inlet 14 is arranged between the transfer windows 12 viewed in the peripheral direction. The width (b) of the air inlet 14 is greater than the distance (c), which is measured in the peripheral direction, so that lateral overlap regions (a) are formed. A piston window 30 is formed in the piston skirt 29. The piston window 30 advantageously extends over at least 10% (advantageously over at least 30% and especially over at least 40%) of the periphery of the piston 5. The piston window 30 advantageously extends in the peripheral direction over approximately 50% of the periphery of the piston 5. The piston window 30 is mounted offset relative to the piston bosses 31 in the direction toward the crankcase 4. The piston window 30 is configured to be approximately rectangular. The piston window 30 could, however, also advantageously have another form. Several and especially two piston windows can be practical. For a movement of the piston 5 in the direction toward the combustion chamber 3, the piston window 30 passes the air inlet 14 and the transfer window 12 and defines a fluid connection between the air inlet 14 and the transfer channels 11.

In this way, combustion air can flow into the crankcase 4 via the air inlet 14, the piston window 30 and the transfer channels 11. An inlet for the air/fuel mixture is not provided. For this reason, the air inlet 14 and the transfer windows 12 can have large flow cross sections so that the supply of a sufficient quantity of combustion air to the crankcase 4 is ensured.

It is understood that the foregoing description is that of the preferred embodiments of the invention and that various changes and modifications may be made thereto without departing from the spirit and scope of the invention as defined in the appended claims.

What is claimed is:

1. A two-stroke internal combustion engine including an engine for a portable handheld work apparatus, the internal combustion engine comprising:

a cylinder having a cylinder wall;

a piston mounted in said cylinder to undergo a reciprocating movement along a stroke path during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

an outlet for conducting exhaust gases away from said combustion chamber;

at least one transfer channel for connecting said combustion chamber to said crankcase at predetermined positions of said piston;

an air channel for supplying combustion air into said crankcase;

a throttle element mounted in said air channel;

a separate fuel inlet in said crankcase;

a fuel metering system for metering fuel into said separate fuel inlet;

said fuel metering system including metering means for metering fuel in dependence upon at least one of the position of said throttle element and the rpm of said engine;

said fuel metering system including a fuel-opening element defining a fuel opening and a control device operatively connected to said fuel-opening element;

said control device including a regulator needle for coacting with said fuel-opening element to control the free cross section of said fuel opening;

said control device including coupling means for coupling the position of said regulator needle to said throttle element;

said throttle element being a throttle flap having a throttle shaft for pivotally mounting said throttle flap in said air channel; and, said control device including a control cross section formed in said throttle shaft for acting on said regulator needle and said control cross section deviating from a circular form.

2. A two-stroke internal combustion engine including an engine for a portable handheld work apparatus, the internal combustion engine being a carburetorless engine and comprising:

a cylinder having a cylinder wall;

a piston mounted in said cylinder to undergo a reciprocating movement along a stroke path during operation of said engine;

said cylinder and said piston con-jointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

an outlet for conducting exhaust gases away from said combustion chamber;

at least one transfer channel for connecting said combustion chamber to said crankcase at predetermined positions of said piston;

an air channel for supplying combustion air into said crankcase;

a throttle element mounted in said air channel;

a separate fuel inlet in said crankcase;

a fuel metering system for metering fuel into said separate fuel inlet;

said fuel metering system including metering means for metering fuel in droplet form or as an emulsion in dependence upon at least one of the position of said throttle element and the rpm of said engine so as to permit an air/fuel mixture to be prepared in said crankcase; and, said fuel inlet being separate from said air channel so as to prevent said fuel from coming together with said combustion air in advance of entry into said crankcase and so as to permit said air/fuel mixture to be prepared in said crankcase.

3. The two-stroke engine of claim 2, said fuel metering system including a fuel-opening element defining a fuel opening and a control device operatively connected to said fuel-opening element.

4. The two-stroke engine of claim 3, said control device including a regulator needle for coacting with said fuel-opening element to control the free cross section of said fuel opening.

5. The two-stroke engine of claim 4, said control device including coupling means for coupling the position of said regulator needle to said throttle element.

6. The two-stroke engine of claim 2, wherein said fuel metering system includes an electromagnetic valve.

7. The two-stroke engine of claim 3, further comprising a fuel channel connected to said separate fuel inlet; and, said fuel metering system being disposed in said fuel channel and said fuel opening of said fuel-opening element opening into said fuel channel.

8. The two-stroke engine of claim 7, said fuel channel having an air inlet upstream of said fuel metering system for admitting air into said fuel channel as a carrier medium for the fuel metered by said fuel metering system.

9. The two-stroke engine of claim 8, further comprising a membrane valve for connecting said separate fuel inlet to said crankcase.

10. The two-stroke engine of claim 8, further comprising a check valve for connecting said separate fuel inlet to said crankcase.

11. The two-stroke engine of claim 2, wherein said separate fuel inlet is piston controlled.

12. The two-stroke engine of claim 2, further comprising an air inlet arranged on said cylinder in the region of said piston; said air channel opening into said air inlet; and, said piston having a piston window and said air inlet communicating via said piston window and said transfer channel with said crankcase when said piston is in predetermined positions.

13. The two-stroke engine of claim 12, wherein said piston window extends over at least 10% of the periphery of said piston.

14. The two-stroke engine of claim 12, wherein said piston window extends over more than 40% of the periphery of said piston.

15. The two-stroke engine of claim 12, wherein said air channel opens directly into said crankcase at predetermined positions of said piston.

16. The two-stroke engine of claim 2, wherein said portable handheld work apparatus is one of a motor-driven chain saw and a cutoff machine.

* * * * *